UNITED STATES PATENT OFFICE.

KRISTIAN BENDIXEN, OF COPENHAGEN, DENMARK.

PROCESS OF TANNING FISH-SKINS OR THE LIKE.

1,235,543. Specification of Letters Patent. Patented Aug. 7, 1917.

No Drawing. Application filed December 29, 1914. Serial No. 879,461.

*To all whom it may concern:*

Be it known that KRISTIAN BENDIXEN, manufacturer, merchant, a subject of the Kingdom of Denmark, residing at No. 10 Puggaardsgade, Copenhagen, Denmark, has invented certain new and useful Improvements in Processes for Tanning Fish-Skins or the like; and he does hereby declare the following to be a full, clear, and exact description of the invention, such as will enable others skilled in the art to which it appertains to make and use the same.

The invention relates to a process for tanning fish skins, such as the skins of sharks, and the like, and the skins of whales, whereby leather may be produced having the same qualities as the leather ordinarily used in the various industries.

Heretofore it has been attempted to employ the ordinary methods of tanning deer skins in tanning fish skins. These methods with certain modifications, including treatment with arsenic and lime, and a subsequent manure-bath, have been used with difficulty and unsatisfactory results in treating fish skins. In attempting this, the fact has been overlooked that treatment with lime, though necessary in tanning deer skins in order to remove the hair, is unnecessary in tanning fish skins or the like which have no hair.

The present invention has for its object a method by which fish skins, from which the salt remaining after the salting is washed out and the quills or the like have been removed, are treated in such a manner that the skins are freed from their great content of oil and other fatty matter, so that they become quite similar in quality to deer skins when the latter have been freed from hair by the treatment with lime and are ready for the tanning step proper.

This result is obtained by a simple treatment with fat-removing means, and then washing the skins and neutralizing the remaining fat-removing means. As fat-removing means, a lye such as a solution of sodium lye, the strength of which depends upon the particular kind of fish skin to be treated, may be used. The excess of lye is neutralized after all or the required amount of oil or fatty matter has been removed, by applying a weak acid solution, such as for instance a solution of muriatic acid. The washing, which can be performed either before or after the lye and acid treatments, is done with cold or warm water.

After this simple treatment, the fish skins are ready to undergo the tanning step proper, in which any ordinary method is followed, and they are like ordinary skins capable of being made to leather or wash-leather, as desired.

If whale skin is to be transformed into wash-leather, it is preferable that all of its content of oil shall not be removed, but only a suitable part of the same. Otherwise, during the tanning step, oil would again have to be supplied to the skin.

By employing the method described, the fish skins are not only rapidly and cheaply prepared for the tanning step, but besides, a great quantity of "dégras" is obtained as a by-product from the oil and fatty matter of the skins, which substance is ordinarily produced only as a by-product from the wash-leather manufacturer.

Having thus described the invention, what is desired to be claimed and to be secured by Letters-Patent, is:

1. The herein described process, which consists in first treating fish-skins or the like with an alkaline solution for a sufficient length of time to remove part of the oil and fatty matter and leave the amount necessary for wash leather, then neutralizing the remaining alkali with acid solution, and washing the skins with water.

2. The herein described process which consists in first treating fish skins or the like with an alkaline solution to remove a part only of the oil and fatty matter and then neutralizing the remaining alkali with a weakened solution, and washing with water.

In testimony whereof, I affix my signature in presence of two witnesses.

KRISTIAN BENDIXEN.